United States Patent [19]

Cook et al.

[11] Patent Number: 5,648,025

[45] Date of Patent: Jul. 15, 1997

[54] METHOD FOR MAKING LIGHT CURED OPHTHALMIC LENS BLOCKS

[75] Inventors: Merritt S. Cook, Muskogee; Michael D. James, Ft. Gibson; Todd R. Strope, Muskogee, all of Okla.

[73] Assignee: Coburn Optical Industries, Inc., Tulsa, Okla.

[21] Appl. No.: 571,442

[22] Filed: Dec. 13, 1995

[51] Int. Cl.$^6$ .................................................. B29D 11/00
[52] U.S. Cl. .................... 264/1.36; 264/1.38; 264/2.7; 425/808; 451/42; 451/390
[58] Field of Search ............................. 156/154, 275.5; 451/42, 323, 325, 921, 390; 264/1.36, 2.7, 162, 1.38; 425/808

[56] References Cited

U.S. PATENT DOCUMENTS

| | | | |
|---|---|---|---|
| 2,304,984 | 12/1942 | Wood | 425/808 |
| 2,426,215 | 8/1947 | Hicks . | |
| 3,257,686 | 6/1966 | Merker et al. | 425/808 |
| 3,354,938 | 11/1967 | Carignan et al. | 425/808 |
| 3,355,342 | 11/1967 | Lanman | 451/42 |
| 3,417,454 | 12/1968 | Beasley | 451/42 |
| 3,491,489 | 1/1970 | Rudd | 451/42 |
| 4,372,368 | 2/1983 | Lombard | 425/808 |
| 4,382,803 | 5/1983 | Allard | 264/2.5 |
| 4,844,143 | 7/1989 | Herbin et al. | 425/808 |
| 5,007,975 | 4/1991 | Yamamoto et al. | 156/154 |
| 5,096,969 | 3/1992 | Payne et al. | 451/390 |
| 5,257,198 | 10/1993 | Van Schoyck | 451/42 |
| 5,380,387 | 1/1995 | Salamon et al. | 156/275.5 |

Primary Examiner—Mathieu D. Vargot
Attorney, Agent, or Firm—Frank J. Catalano; Scott R. Zingerman

[57] ABSTRACT

A machine and process for making an ultraviolet cured block for an ophthalmic lens are provided in which a lens is placed at an input port to the machine by an operator. Data related to the lens is fed to or stored in the machine from either a keyboard or a data base. The lens is then collected from the input port for processing and transported, preferably by means of pneumatics, to a block molding point within the confines of the machine. A special adhesive is administered to the surface of a mold unit and the mold unit is then positioned to receive the lens. Pressure is applied to squeeze the lens against the adhesive and the mold. After molding the adhesive onto the lens, the lens and mold are transported via servo slide to a UV station where curing takes place from above the lens. After preliminary curing, the lens and mold unit are taken to a removal station and the lens, together with the adhesive cured to its front surface, is removed from the mold unit, again preferably by means of pneumatics. The separated blocked lens is then transported to a second curing station where it is cured by UV from the underside before being released to the operator. In the final stage of the cycle, a daubing unit is used to apply a releasing agent to the surface of the mold in preparation for the next cycle.

16 Claims, 3 Drawing Sheets

METHOD FOR MAKING LIGHT CURED OPHTHALMIC LENS BLOCKS

BACKGROUND OF THE INVENTION

This invention relates generally to the manufacture of ophthalmic lenses and more particularly concerns the application of universal blocks to any of wide variety of lens contours.

Presently known lens blocking procedures typically involve the application of a preformed block to the surface of the lens. While preformed blocks assure identicity of their adapter surface with the surface of the adapter to be used, preformed blocks cannot be universal to all lenses. As a result, the contour of the surface of any given lens rarely flushes with the contour of the block applied to the lens. It is, therefore, common practice to build up the lens surface to accommodate the contour of the block. In addition to the added time and labor involved in this individualized blocking process, materials also pose a problem. Unfortunately, known build-up processes generally involve use of alloys which give rise to operator safety and environmental protection complications. In addition, the build-up processes generally involve the exercise of operator judgment in assessing the amount of build up necessary for each lens. Such subjective decision making does not foster consistency in the quality of block application. These problems are compounded by the need to apply different blocks to the same lens for the lens surfacing and finishing processes. Moreover, the application of build-up materials to the lens with the superimposition of the preformed block over the build-up generally makes inspection of the blocked lens after surfacing for optical power and center thickness difficult, if not impossible, without removal of the block from the lens.

It is, therefore, an object of this invention to provide a block-making machine and process for manufacturing an alloy less block for the lens industry. Another object of this invention is to provide a block-making machine and process for a universal block applicable to all radii on its lens contact surface. A further object of this invention is to provide a block-making machine and process for a universal block having a single common radius on its reverse or adapter contact side. Yet another object of this invention is to provide a block-making machine and process for a block which serves as both a surfacing and finishing block. Still another object of this invention is to provide a block-making machine and process for a block allowing optical power and center thickness inspection without removing the block. And it is an object of this invention to provide an automated method of forming and attaching a block to any lens.

SUMMARY OF THE INVENTION

In accordance with the invention, a machine and process are provided in which a lens is placed at an input port to the machine by an operator. Data related to the lens is fed to or stored in the machine from either a keyboard or a data base. The lens is then collected from the input port for processing and transported, preferably by means of pneumatics, to a block molding point within the confines of the machine. A special adhesive is administered to the surface of a mold unit and the mold unit is then positioned to receive the lens. Pressure is applied to squeeze the lens against the adhesive and the mold. After molding the adhesive on to the lens, the lens and mold are transported via servo slide to a UV station where curing takes place from above the lens.

After preliminary curing, the lens and mold unit are taken to a removal station and the lens, together with the adhesive cured to its front surface, is removed from the mold unit, again preferably by means of pneumatics. The separated blocked lens is then transported to a second curing station where it is cured by UV from the underside before being released to the operator. In the final stage of the cycle, a daubing unit is used to apply a releasing agent to the surface of the mold in preparation for the next cycle.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
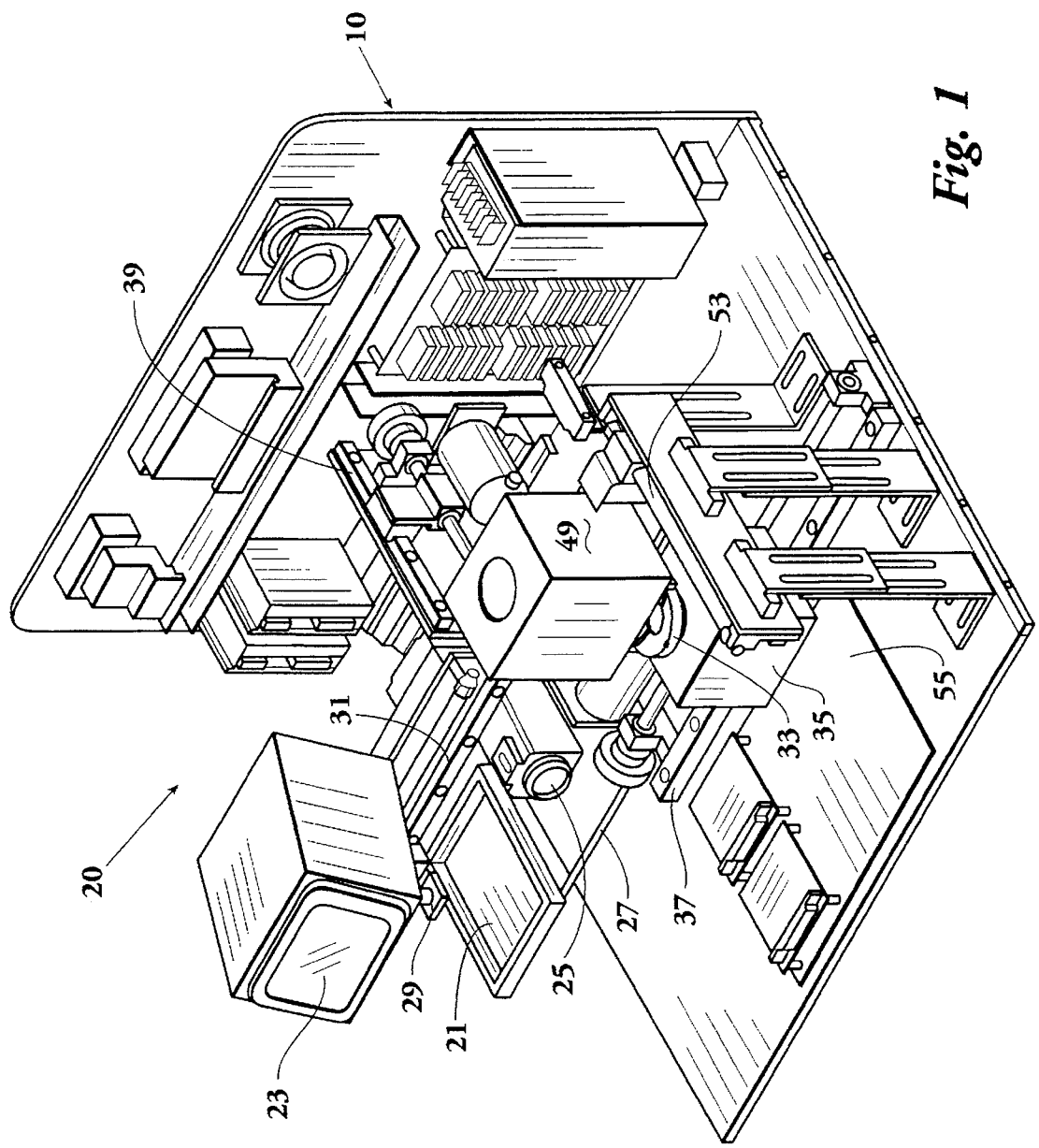
FIG. 1 is a perspective view of a preferred embodiment of the machine for making ultraviolet cured ophthalmic lens blocks.
Figure 2:
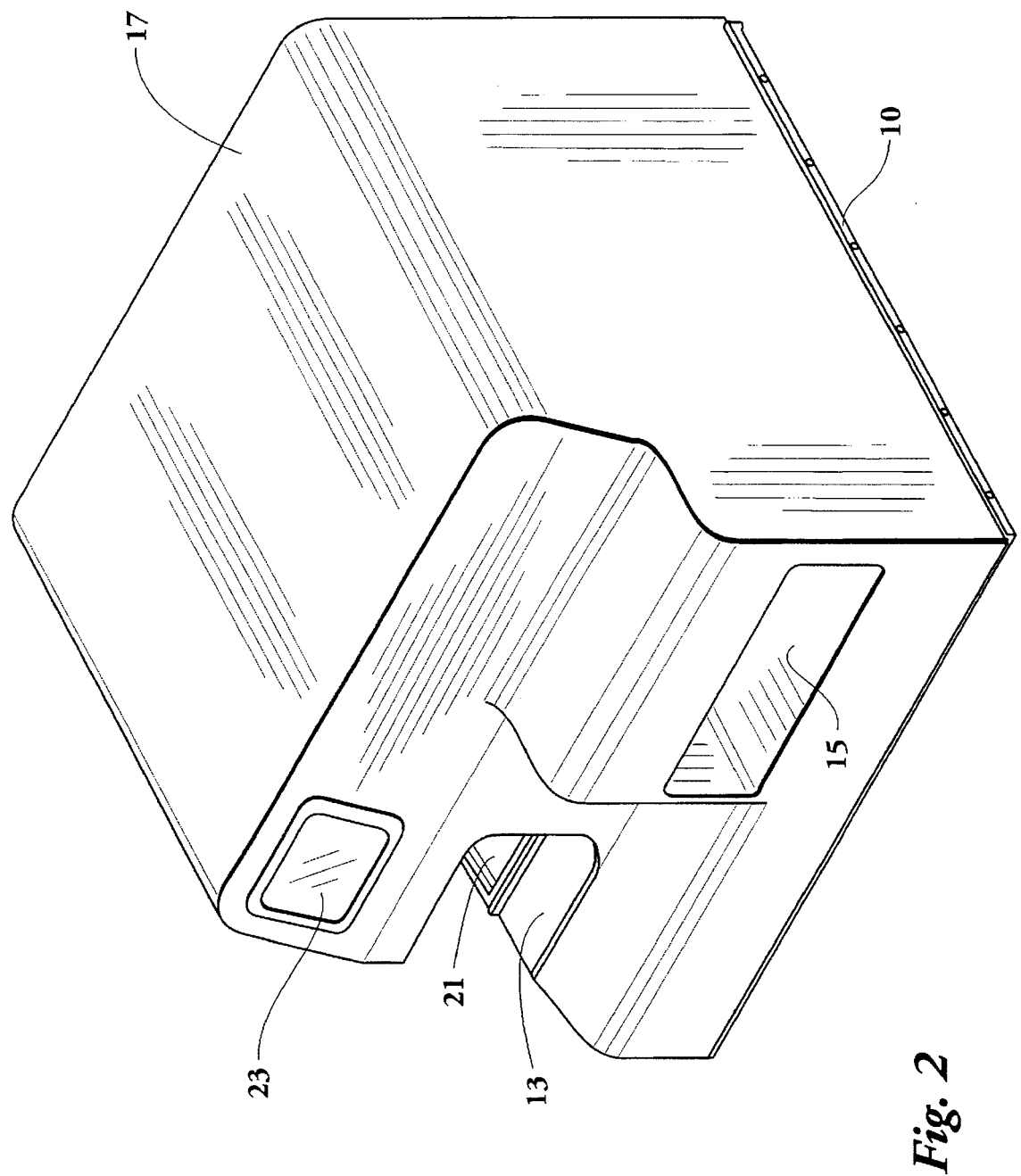
FIG. 2 is a perspective view of a preferred embodiment of the case of the machine of FIG. 1.

Turning first to FIGS. 1 and 2, a preferred embodiment of the machine for making ultraviolet cured lens blocks consists of a cabinet 10 containing a working assembly 20 which includes pneumatic slides, UV lamp units and the control and electronic devices required to operate the machine. The machine is computer controlled using servos combined with air slides to move the lens along the process line from an input port 13 to an output port 15 in a casing 17 covering the working assembly 20. The casing 17 slides to the front of the machine for access to the working assembly 20.

Figure 3:
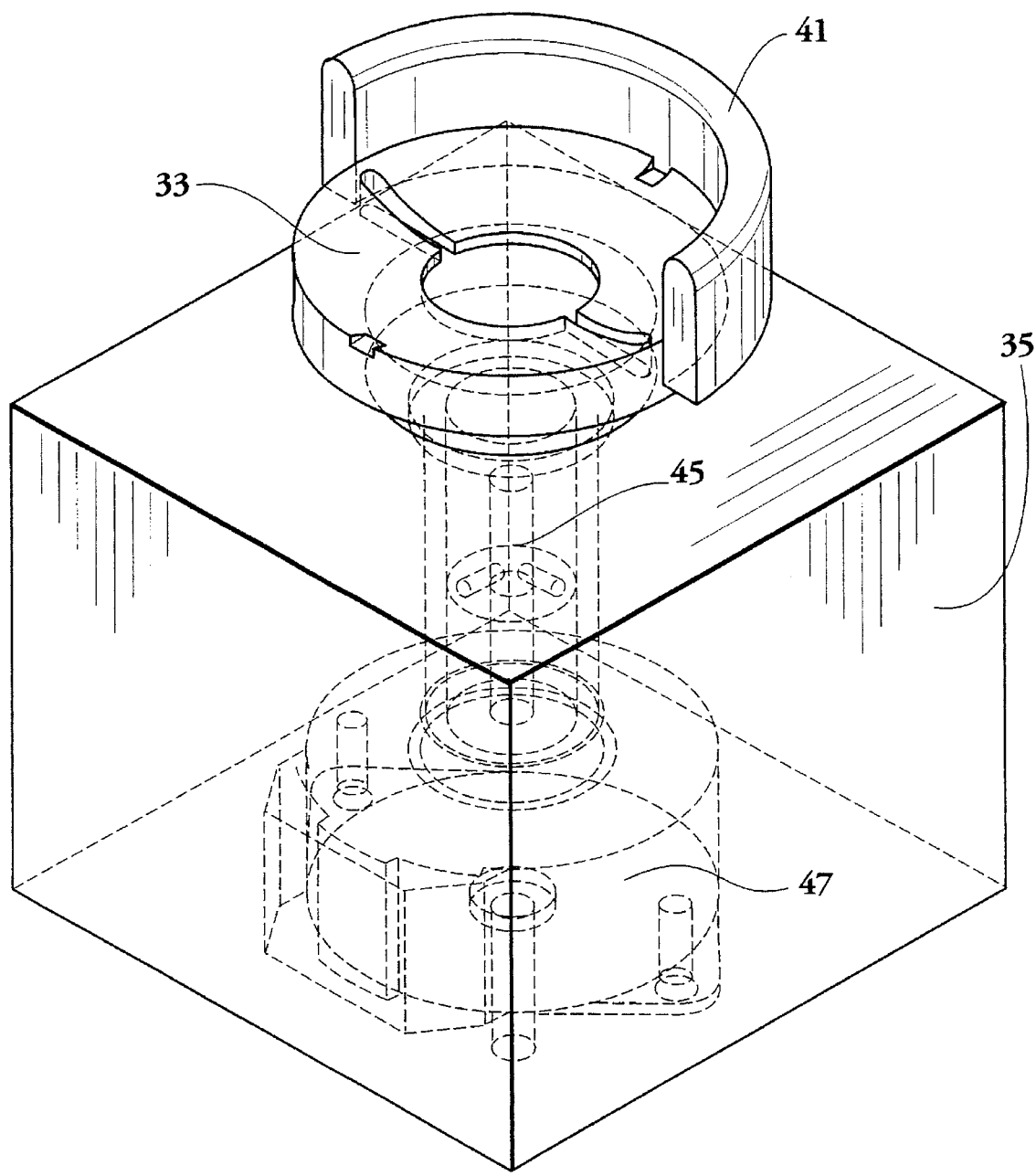
FIG. 3 is a perspective view of a preferred embodiment of the mold unit of the machine of FIG. 1.

A lens to be blocked is placed on a small platform 21. The lens is seated on a three point kinematic mount and manipulated on the mount by the operator to orient the lens correctly with respect to a target superimposed on a CR Screen 23 above the platform. A camera 25 located below the platform 21 is aligned with a mirror 27, preferably at 45 degrees to the platform 21. The camera 25 captures the image of the lens, superimposing the lens image over and the target so that both are seen by the operator on the screen 23. The operator can then correctly position the lens on the target to obtain a center for the lens in either a geometric or optical sense. When the lens is correctly located, the operator manually operates a switch activating a pneumatic slide pick up 29 that carries the lens along a lens transfer slide 31 it, to a position of alignment for placement on a mold 33. Approximately simultaneously with the locating of the lens on the platform 21, a servo-controlled mold unit 35 is moved in one axial direction by another pneumatic slide 37 to a position under an adhesive dispenser. The dispenser is activated pneumatically to control the amount of adhesive to be dispensed and is mounted on a third servo-controlled electromechanical slide 39 for movement in an axial direction normal to the mold axial direction of movement 37. The adhesive is dispersed in a liquid state as a liquid or preferably, as a gel. In order to dispense the adhesive evenly over the entire surface of the mold 33, the mold unit 35 and the dispenser are moved on their axes 37 and 39 simultaneously to define a predetermined path such as, for example, a series of circular loops. The dispensing path and mold design are preferably selected to keep adhesive out of a small area at the center of the mold to allow optical inspection and center thickness measurement after curing. When application of the adhesive to the mold 33 is complete, the mold unit 35 is moved along its axis 37 away from the dispenser and toward the platform 21 to a lens receiving location where the lens is released onto a lens locating ring 41 in the mold unit 35 by the pneumatic pick up 29. Simultaneously with movement of the mold unit 35 toward the platform 21, the dispenser is moved on its axis 39 to a rest position. With the lens positioned above the mold 33, it is moved downwardly by the pick up 29 to the lens locating ring 41, preferably a metal half or partial ring. This partial ring 41, which partially encircles the mold 33, supports the lens. When the lens is fully seated on the ring 41, a pneumatically aided retaining arm 43 is extended over the lens and downwardly urged to hold the lens still in this position. The pneumatic pick up 29 is then withdrawn, leaving the lens on the ring 41 held in place by the retaining arm 43. The mold 33, which is mounted on the shaft 45 of a stepper motor 47, as can best be seen in FIG. 3, is then moved up towards the lens by the operation of the stepper motor 47 compressing the dispensed adhesive between the lens and the mold 33. The stepped compressive action ensures that the adhesive is adequately spread between the mold 33 and the lens and also that the adhesive fills any voids or spaces resulting from differences in contours that the lens brings to the lens/mold relationship. Consequently, almost any type of lens can be properly combined with the mold 33 regardless of the contour of the lens. The mold ensures that, if the adhesive is correctly distributed, identical contour will be presented to a chuck adapter regardless of the contour of the lens. The mold 33 comes to rest when the stepping action is complete and the mold unit 35 with the lens is moved along the mold transport axis 37 to position the lens and adhesive under a first stage UV lamp unit 49. A trap at the bottom of the lamp unit 49 opens and the lamp floods the adhesive and lens with UV light, curing the adhesive for a fixed period of time to allow adequate bonding of the adhesive to the lens. When the fixed curing time has elapsed, the trap is closed and the mold unit 35 is again moved along the slide on its transfer axis 37 to a pick-up point. At the same time, the mold 33 is moved downwardly by the stepper motor 47, removing the mold 33 from the surface of the adhesive and ensuring that the lens and the adhesive are property separated from the mold 33. A second pneumatic pick-up device 51 then collects the lens. The lens is taken by a pneumatic slide 53 along a curing transport axis to a second UV curing station 55 where a second UV light is located underneath the lens and shines directly onto the adhesive to ensure that the curing is fully completed. After a fixed period of time, the curing transport slide 53 moves the lens with the UV cured adhesive block to a drop station at the casing outlet 15 in the front of the casing 17 to be presented to the operator for removal. The lens now has a molded adhesive material block attached to its front face for placement into a chuck adaptor so that the lens can be cut to the required prescription. Preferably, the mold will be designed to result in a block of substantially concentric segments divided by a thinner or perforated segment of adhesive so that the outer concentric segment can be removed from the lens after surfacing, resulting in a smaller block defined by the inner segment for the edging process. The pneumatic pick-up device 53 that released the lens to the operator now moves back along its slide and picks up a "daubing" sponge 57. The device 53 takes the sponge 57 to the end of the mold transport slide 37 where the mold 33 is still positioned. The pick up 53 moves the daubing sponge 57 downwardly, pressing it onto the top face of the mold 33 and administering a quick releasing agent to the surface of the mold 33, thus facilitating the easy removal of the molded adhesive in the next curing cycle. Finally, the mold unit 35 is moved on the mold transport slide 37 back to its initial cycle position under the adhesive dispenser.

While the preferred curing method is use of ultra violet light, curing with light other than ultra violet is also possible. Both curing stations 49 and 55 may therefore use lamps other than UV lamps.

Thus, it is apparent that there has been provided, in accordance with the invention, a machine and process that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method of applying a block to a blocking surface of an ophthalmic lens comprising the steps of:

filling a mold for the block with adhesive material in a liquid state;

compressing the blocking surface of the lens against the liquid state adhesive material and the mold to spread the adhesive material and fill the voids between the mold and the lens blocking surface; and curing the adhesive material with light to set the adhesive material in a solid state and to bond the adhesive material to the lens blocking surface and separating the mold from the bonded adhesive material and the lens to thereby form a block on the lens.

2. A method of applying a block to a blocking surface of an ophthalmic lens comprising the steps of:

filling a mold for the block with adhesive material in a liquid state;

compressing the blocking surface of the lens against the liquid state adhesive material and the mold to spread the adhesive material and fill the voids between the mold and the lens blocking surface;

curing the adhesive material with light from a source on a lens side of the adhesive material to set the adhesive material in a solid state and to bond the adhesive material to the lens blocking surface;

separating the mold from the bonded adhesive material and lens; and curing the adhesive material with light from a source opposite the lens side of the adhesive material to assure completion of solidification and bonding to thereby form a block on the lens.

3. A method according to claim 1 further comprising the step of daubing a block surface of the mold with a releasing agent to prepare the mold for filling with adhesive material in a liquid state.

4. A method according to claim 1, said step of filling further comprising the substeps of:

determining the amount of adhesive material needed to fill the voids between the mold and the lens blocking surface; and limiting the dispensation of adhesive material from a source thereof to the determined amount.

5. A method according to claim 4, said step of determining comprising the substeps of:

identifying the lens in relation to its contour;

accessing a data bank correlating lens contours to respective volumes of adhesive material needed to fill the voids; and selecting the volume correlated to the contour of the identified lens.

6. A method according to claim 5 further comprising the steps of:

positioning the lens on a platform in an orientation centering the lens for blocking;

picking the lens up from the platform servomechanically to maintain its centering orientation;

transferring the lens to a position above the mold filled with adhesive material; and placing the lens servomechanically on a support ring above the filled mold in its centering orientation.

7. A method according to claim 6 further comprising the step of servomechanically temporarily clamping the placed lens to the support ring.

8. A method according to claim 6, said step of positioning comprising the substeps of:

imaging a target reference on s display screen;

superimposing a video camera image of the lens on the target reference; and manually adjusting the location of the lens on the platform to align the lens image with the target reference.

9. A method according to claim 1 further comprising a step of feeding the adhesive material from an outlet port in a dispenser thereof into the mold along a path predetermined to relatively evenly distribute the adhesive material therein.

10. A method according to claim 9, said step of feeding comprising the substeps of:

servomechanically reciprocating the mold along a first horizontal axis; and simultaneously servomechanically reciprocating the outlet port of the dispenser of the adhesive material along a second horizontal axis, the mold reciprocation being coordinated with the outlet port reciprocation to provide the predetermined path.

11. A method according to claim 9, said predetermined path being selected to prevent feeding of adhesive material at a center area of the mold.

12. A method according to claim 1, said step of compressing comprising the substeps of:

placing the lens servomechanically over the filled mold on a ring-like support member;

clamping the placed lens servomechanically to the support member; and raising the filled mold upwardly by use of a stepping motor until the voids between the mold and the lens blocking surface are filled.

13. A method according to claim 2, said step of separating comprising driving the mold downwardly in relation to the bonded lens and adhesive material by use of a stepper motor having a shaft connected to the mold.

14. A method according to claim 1, said step of curing being by ultra violet light.

15. A method according to claim 2, said step of curing being by ultra violet light.

16. A method according to claim 1, said liquid state of adhesive being a gel.

* * * * *